April 7, 1931. W. F. HILLPOT 1,799,514
INCUBATOR
Filed Sept. 7, 1929 2 Sheets-Sheet 1
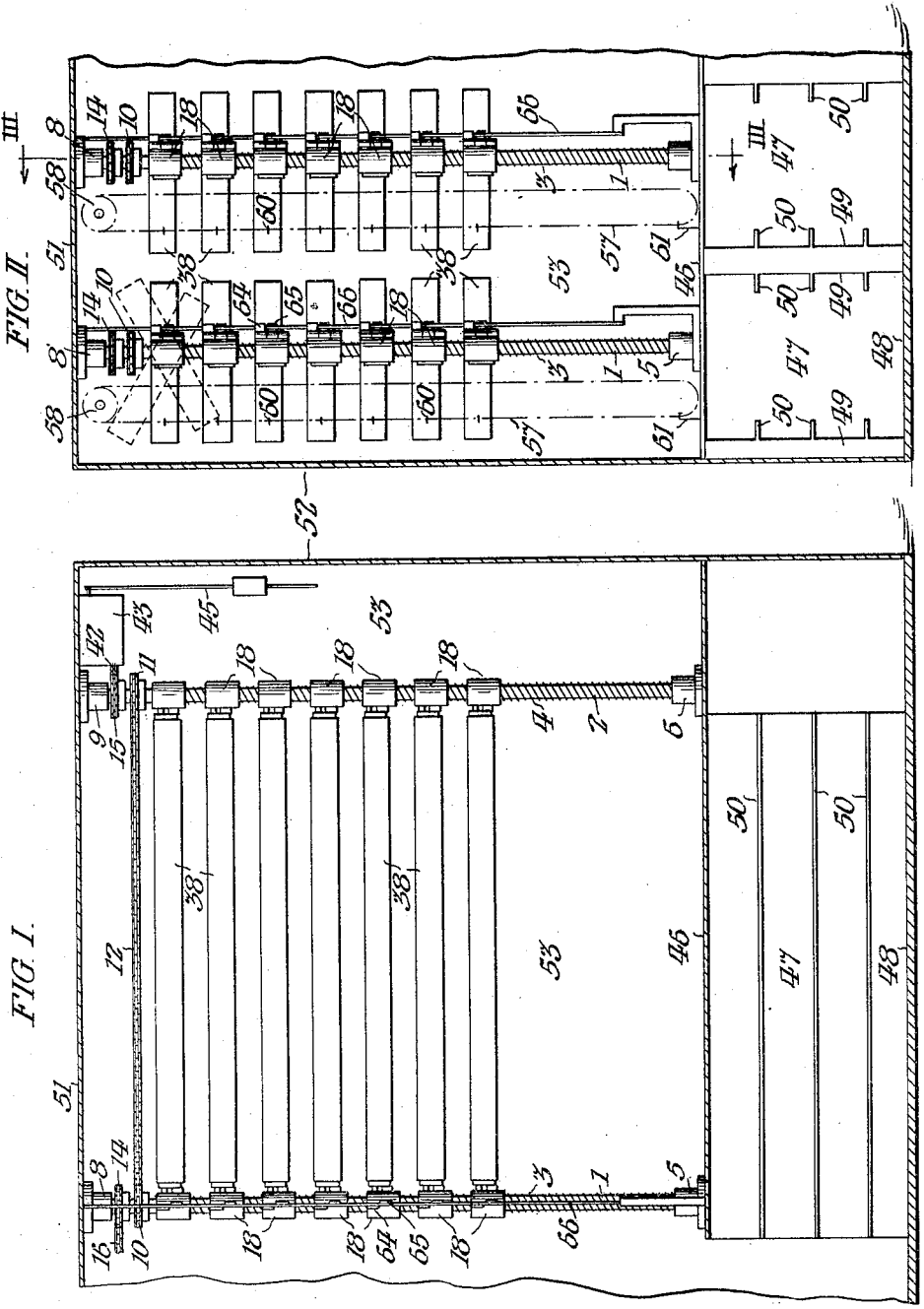
INVENTOR:
WILLIAM FINNEY HILLPOT,
BY
Attorney.

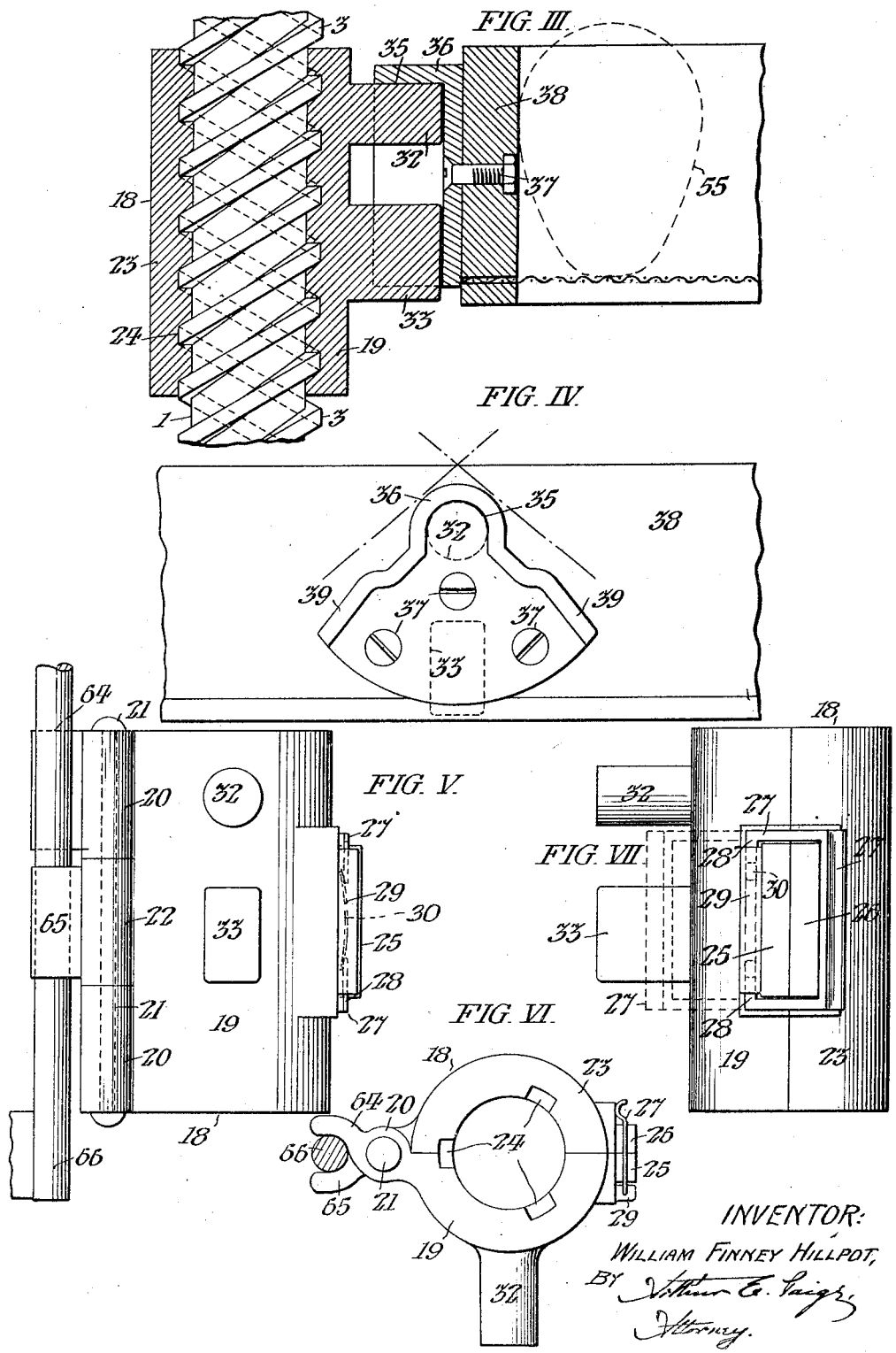

Patented Apr. 7, 1931

1,799,514

UNITED STATES PATENT OFFICE

WILLIAM FINNEY HILLPOT, OF FRENCHTOWN, NEW JERSEY

INCUBATOR

Application filed September 7, 1929. Serial No. 391,030.

It is the object of my invention to provide means for supporting eggs, during the period of incubation thereof, in such manner that the eggs may be repeatedly turned, at intervals, in simulation of the turning movements naturally imparted to such eggs by the mother birds, and in such environment as to afford the desired degree of warmth during such period, while maintaining the eggs in such relation to each other that they may be individually inspected at any time; and means for contemporaneously shifting a plurality of egg trays, in vertical tiers, from a region of charge, in which the trays contain fresh eggs, to a region where the chicks are hatched therefrom and ready to be discharged. Such apparatus may be advantageously employed to effect which is known as "stage" incubation, in which eggs in various stages of incubation are contemporaneously present in the incubator, so that the latter may be used to hatch chicks every day, instead of at intervals of the gestation period of twenty-one days, and with the advantage that chicks thus produced are more readily marketed.

As hereinafter described; I find it convenient to provide egg supporting means including trays which are rectangular frames open at the top but covered at the bottom with foraminous material, such as insect wire screening; each of said trays having, at opposite ends thereof, axially alined pivot means adapted to detachably engage complementary pivot means with respect to which the trays may be tilted in either direction to a degree conveniently limited by the correlation of the pivot means respectively on the tray and engaged therewith; so that each tray may rest stably in either position of inclination and accidental spilling of the contents of the tray is prevented.

As hereinafter described; the pivot means on the trays are adapted to be engaged with pivotal supports which are carried by nuts mounted for vertical reciprocation on respective screw shafts extending vertically intermediate of the width of the trays, and having threads of such rapid pitch that when the shafts are free to turn, the mere weight of the trays suffices to turn them and permit the trays to descend, by gravity, from the top to the bottom of said shafts. Such shafts are suitably journaled at their upper and lower ends, and, to lower the trays evenly, are coupled for simultaneous rotation; conveniently by sprocket chains engaging sprocket gear wheels respectively rigidly connected with said shafts. The speed of rotation of said shafts, and consequent time required for the progression of each tray from the position of charge to the position of discharge is determined by an escapement. As hereinafter described; such an escapement may be conveniently operatively connected with a gear wheel on one of said shafts and be of the clock pendulum type shown in Letters Patent of the United States No. 1,722,214 granted to me July 23, 1929. However, any other suitable escapement may be employed.

My invention includes the various novel features of construction and arrangement hereinafter more definitely specified.

In said drawings; Fig. I is a fragmentary vertical sectional view of an incubator structure conveniently embodying my improvements.

Fig. II is a front elevation of the structure shown in Fig. I.

Fig. III is a fragmentary vertical sectional view taken on the line III in Fig. II showing the construction and cooperative relation of the pivotal supports for the egg trays.

Fig. IV is a fragmentary end elevation of a tray showing the pivotal supporting plate thereon.

Fig. V is an elevation of the pivotal support complementary to that shown in Fig. IV and including a split nut adapted for engagement with a screw shaft.

Fig. VI is a plan view of the structure shown in Fig. V.

Fig. VII is an elevation of the right hand side of the structure shown in Fig. V.

In said figures; the vertical screw shafts 1 and 2 having rapid pitch screw threads 3 and 4 are journaled in respective step bearings 5 and 6, preferably of the roller or ball bearing type, and are journaled at their upper ends in the respective bearings 8 and 9 also of the roller or ball bearing type. Said screw shafts 1 and 2 have respective sprocket gears 10 and 11 rigidly secured thereon at their upper ends and connected by the sprocket chain 12 so that said shafts 1 and 2 are coupled for simultaneous turning movement.

Either or both of said shafts 1 and 2 may also have sprocket wheels 14 and 15 rigidly secured thereon for connection by chains 16 with other pairs of similar shafts so that all of such shafts may be coupled for simultaneous rotation.

Each of said screw shafts is adapted to engage a series of split nuts 18. As shown in Figs. V, VI, and VII, each of said nuts comprises a semicylindrical member 19 having hinge lugs 20 connected by a pintle 21 with the hinge lug 22 on the semicylindrical member 23 which is complementary to said member 19. Said nut members 19 and 23 have screw threads 24 which when the nut is held together as in Fig. VI, are continuous and fitted to engage and cooperate with screw threads 3 and 4 on said screw shafts 1 and 2. Said nut members 19 and 23 have keeper lugs 25 and 26 adapted to be held together by the shackle 27 which has pivot lugs 28 engaged in the bearing 29, upon which said shackle may be swung to and from the operative position shown in Figs. VI and VII in which position it is normally held by the spring 30 in said bearing 29. The arrangement is such that said shackles may be instantly turned out from the position shown in full lines in Fig. VII to the position shown in dotted lines in said figure to release the respective nuts 18 so that they may be opened for removal or replacement with respect to said screw shafts. Each of said nut members 19 carries in rigid relation therewith a pivot stud 32 and a stop lug 33 projecting at right angles to the axis of the screw bore therein.

Said pivot studs 32 upon the nuts 18 are fitted for detachable engagement in the respective sockets 35 of pivot plates 36 which are rigidly connected, conveniently by screws 37, with the opposite ends of the rectangular tray frames 38. Each of said pivot plates 36 has inverted V-shaped flanges 39 to alternately contact with opposite sides of the respective stop lugs 33 on said nuts 18; the included angle between said flanges 39 being say eighty degrees, so as to permit the trays to be inclined at an angle of forty degrees to the horizontal, in either direction, as indicated in dash lines in Fig. IV. Such construction and arrangement of the pivot means respectively carried by the screw shafts and by the trays, permit the latter to be instantaneously connected and disconnected with respect to said screw shafts, by merely lifting the trays with their pivot plates 36 over said studs 32 and, when the trays and plates are placed in such operative relation as in Fig. I, they may be lowered from the top to the bottom of said screw shafts 1 and 2 at any rate determined by the rate of of rotation of said shafts occasioned by the weight of the trays and controlled by any suitable means.

As indicated in Fig. I, I find it convenient to operatively connect with the gear wheel 15 an escapement including the gear wheel 42. The train of reducing gears connected with said gear 42 is conveniently inclosed in the stationary casing 43 and the member of said train most remote from said gear 42 is operatively connected with the oscillatory pendulum 45; so that said escapement operates like an ordinary clock mechanism actuated by a pendent weight; the weight in the present instance being that of the trays and their contents.

As indicated in Fig. I, said shaft bearings 5 and 6 may be rigidly connected with the top wall 46 of a hatching compartment 47 having the floor 48, and the opposite side walls 49 of which have oppositely projecting bracket ledges 50 adapted to support individual trays 38, while the chicks are escaping from their shells. The upper bearings 8 and 9 for said screw shafts may be rigidly connected with the roof or ceiling 51 of the incubator housing 52, which may be of any suitable form or dimensions and provided with means to warm, circulate, and moisten the air in the egg chamber 53 inclosed by said housing.

The arrangement described is such that as each of said trays 38 reaches its lowermost position in connection with said screw shafts 1 and 2, it may be lifted off its pivotal supports 32, covered, and pushed into the hatching compartment 47. As the opposite nuts 18 are thus relieved of the trays in succession, they may be released from the screw shafts at the bottom thereof and replaced at the top thereof, and trays containing fresh eggs be replaced in connection therewith so that the operation is practically continuous, altho the downward movement of the trays may be checked at any time by stopping the oscillation of the pendulum 45.

In order to prevent the embryos from sticking to the shells, the eggs 55 should be turned at intervals not exceeding eight hours, and preferably six hours, from one position of inclination to the opposite position indicated by the dash lines in Fig. IV. I find it convenient to effect such turning movements by providing an endless chain 57 which is suspended from a chain wheel 58 and adapted to engage each of the trays, conveniently by hook studs 60 rigidly connected with the respective trays, as indicated in Fig. II. Said chain may be held in either position of adjustment by engagement with a hook stud 61, conveniently rigidly connected with said top wall 46 of the hatching compartment 47, as indicated in Fig. II. However, any suitable means for tilting and detaining said trays in tilted position may be employed.

Altho said nuts 18 may be free to turn upon the shaft when released from engagement with the pivot plates 36 of the trays 38; said plates suffice to hold said nuts with their pivot studs 32 in axial alinement when said plates 36 are engaged therewith. However, said nut members 19 and 23 have respective lugs 64 and 65 adapted to loosely embrace between them a guide rod or wire 66 to hold said nuts with their pivot studs 32 in axial alinement when the trays are removed therefrom; so as to facilitate the removal and replacement of the trays with respect to the nuts as described.

Therefore, I do not desire to limit myself to the precise details of construction, arrangement, or method of operation herein set forth, as it is obvious that various modifications may be made therein without departing from the essential features of my invention, as defined in the appended claims.

I claim:—

1. In an incubator; the combination with an egg tray; of means arranged to support said tray and permit it to be progressed by its own weight, including a shaft having a rapid pitch screw thread, and a nut adapted to traverse said shaft and having means adapted for detachable engagement with said tray.

2. A structure as in claim 1; including two such screw shafts and means operatively connecting them for simultaneous rotation; whereby nuts upon the respective shafts are progressed at the same rate to hold the tray even.

3. Apparatus as in claim 1; including adjustable retarding means limiting the rate of rotation of said shaft and the consequent rate of progression of the tray.

4. Apparatus as in claim 1; including adjustable retarding means limiting the rate of rotation of said shaft and the consequent rate of progression of the tray, including an oscillatory pendulum escapement.

5. Apparatus as in claim 1; including pivotal connecting means between said tray and nut, and means limiting the turning movement of said tray with reference to said nut; whereby spilling movement of said tray is prevented.

6. Apparatus as in claim 1; including means adjustable to tilt said tray and turn the eggs, independently of the progression of said tray by said screw.

7. Apparatus as in claim 1; including pivotal connecting means between said tray and nut, and means limiting the turning movement of said tray with reference to said nut; whereby spilling movement of said tray is prevented; and means adjustable to tilt said tray to turn the eggs, independently of the progression of said tray by said screw.

8. Apparatus as in claim 1; including pivotal connecting means between said tray and nut, and means adjustable to tilt said tray to turn the eggs, independently of the progression of said tray by said screw, and including an endless chain detachably connected with said tray, and a wheel supporting said chain independently of said tray and screw.

9. Apparatus as in claim 1; including pivotal connecting means between said tray and nut, and means, local to said pivotal connecting means and adapted to limit the turning movement of said tray with reference to said nut; whereby spilling movement of said tray is prevented; and means adjustable to tilt said tray to turn the eggs, independently of the progression of said tray by said screw.

10. Apparatus as in claim 1; including pivotal connecting means between said tray and nut, and means local to said pivotal connecting means and adapted to limit the turning movement of said tray with reference to said nut; whereby spilling movement of said tray is prevented; and means adjustable to tilt said tray to turn the eggs, independently of the progression of said tray by said screw, including an endless chain detachably connected with said tray, and a wheel supporting said chain.

11. In an incubator; the combination with an egg tray; of means arranged to support said tray and permit it to be progressed by its own weight, including a shaft having a rapid pitch screw thread, and a nut adapted to traverse said shaft and having means adapted for detachable engagement with said tray; said nut being split and thus adapted for detachable connection with said shaft, and means carried by said nut, adjustable to alternately hold said nut in cooperative relation with said shaft and release said nut from said shaft.

12. In an incubator; the combination with an egg tray; of means arranged to support said tray and permit it to be progressed by its own weight, including a shaft having a rapid pitch screw thread, and a nut adapted to trasverse said shaft and having means adapted for detachable engagement with said tray; said nut being split and thus adapted for detachable connection with said shaft, and means carried by said nut, adjustable to alternately hold said nut in cooperative relation with said shaft and release said nut from said shaft, including hingedly connected parts.

13. In an incubator; the combination with a plurality of egg trays; of means arranged to support said trays and permit them to be progressed by their own weight, including a plurality of parallel shafts each having a rapid pitch screw thread, nuts adapted to traverse said shafts and having means adapted for detachable engagement with said trays; and means operatively connecting said shafts for simultaneous rotary movement.

14. In an incubator; the combination with a plurality of egg trays; of means arranged to support said trays and permit them to be progressed by their own weight, including a plurality of parallel shafts each having a rapid pitch screw thread, nuts adapted to traverse said shafts and having means adapted for detachable engagement with said trays; and means operatively connecting said shafts for simultaneous rotary movement, including wheels on the respective shafts and a belt connecting said wheels.

15. An incubator structure as in claim 13; including retarding means operative to control the rate of progression of said trays.

16. An incubator structure as in claim 13; including retarding means operative to control the rate of progression of said trays; and means controlling said retarding means, including a pendulum; whereby the rate of progression of said trays may be adjustably predetermined.

17. In an incubator; the combination with a plurality of egg trays; of means arranged to support said trays and permit them to be progressed by their own weight, including a plurality of parallel shafts each having a rapid pitch screw thread, nuts adapted to traverse said shafts and having means adapted for detachable engagement with said trays; and means operatively connecting said shafts for simultaneous rotary movement, including wheels on the respective shafts and means connecting said wheels.

In testimony whereof, I have hereunto signed my name at Philadelphia, Pennsylvania, this twenty-second day of August, 1929.

WILLIAM FINNEY HILLPOT.